United States Patent [19]

Berger

[11] Patent Number: 4,756,653

[45] Date of Patent: Jul. 12, 1988

[54] FASTENING ELEMENT FOR SECURING PACKING SHEETS

[75] Inventor: Hellmut Berger, Neulengbach, Austria

[73] Assignee: Rehau AG & Co., Rehau, Fed. Rep. of Germany

[21] Appl. No.: 535,052

[22] Filed: Sep. 23, 1983

[30] Foreign Application Priority Data

Sep. 23, 1982 [AT] Austria .................. 3544/82

[51] Int. Cl.$^4$ .............................................. F16B 35/04
[52] U.S. Cl. ............................ 411/411; 411/426; 411/908; 411/386; 411/398
[58] Field of Search .............. 411/411, 414, 415, 425, 411/426, 403, 386, 387, 392, 427, 429–431, 900, 904, 907, 908, 394, 378, 398, 412, 413, 416

[56] References Cited

U.S. PATENT DOCUMENTS

| | | | |
|---|---|---|---|
| 591,798 | 10/1897 | Strauss | 411/398 |
| 635,297 | 10/1899 | Caldwell | 411/411 |
| 984,969 | 2/1911 | Reiniger | 411/426 |
| 1,015,890 | 1/1912 | Hyde | 411/398 |
| 1,114,135 | 10/1914 | Hafertep | 411/411 |
| 1,260,154 | 3/1918 | Day | 411/426 |
| 1,336,773 | 4/1920 | Caldwell | 411/394 |
| 1,436,743 | 11/1922 | Wild | 411/398 |
| 2,308,914 | 1/1943 | Gerhold | 411/414 |
| 2,437,381 | 3/1948 | Cullen | 411/908 |
| 4,403,895 | 9/1983 | Caldwell et al. | 411/908 |

FOREIGN PATENT DOCUMENTS

| | | | |
|---|---|---|---|
| 0058252 | 7/1984 | . | |
| 763737 | 8/1951 | Fed. Rep. of Germany . | |
| 2261441 | 10/1977 | France . | |
| 2401349 | 3/1979 | France . | |
| 2403712 | 6/1982 | France . | |
| 691793 | 5/1953 | United Kingdom . | |
| 1354351 | 5/1974 | United Kingdom | 411/908 |
| 487251 | 1/1976 | U.S.S.R. | 411/900 |

Primary Examiner—Neill Wilson
Attorney, Agent, or Firm—Spencer & Frank

[57] ABSTRACT

A fastening element for packing sheets comprises a body having a lateral surface; a thread provided on the lateral surface; a head plate situated at an end of the body and having a diameter larger than a largest diameter of the thread; and a recess extending in the head plate and terminating in the body. The recess is situated centrally with respect to the head plate and has a part configured for receiving a tool for turning the fastening element.

5 Claims, 1 Drawing Sheet

U.S. Patent    Jul. 12, 1988    4,756,653
FIG. 1
FIG. 1a
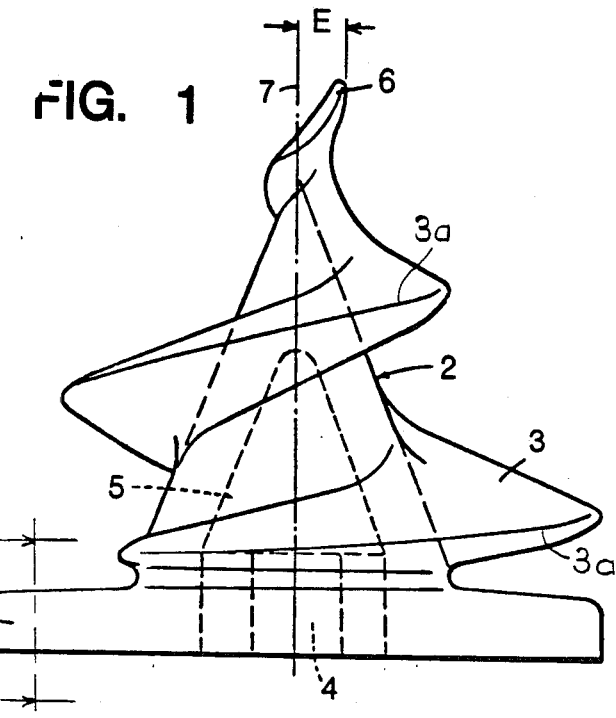
FIG. 2
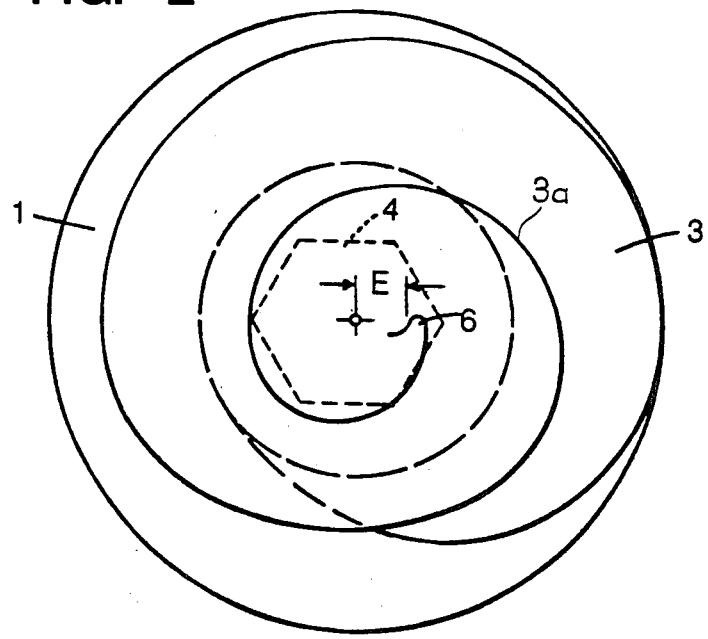

FASTENING ELEMENT FOR SECURING PACKING SHEETS

BACKGROUND OF THE INVENTION

This invention relates to a fastening element for packing material, particularly for corrugated cardboard sheets.

Packing material for industrial products such as refrigerators, television sets and the like usually comprises a cardboard sheet, such as a corrugated paper blank which is folded to form a box or a frame and which is held together by fastening elements.

The expenses involving the manufacture of the fastening elements are substantial, the required devices are complicated and liable to operational malfunction and furthermore, the packages may frequently be opened only by applying a substantial tearing force. In such an opening operation the risks of injury by the sharp fastening elements are high. Further, a re-use of the packings is frequently not possible. The disadvantages of known packages of the above-outlined type are particularly pronounced in case of intermediate or semi-finished products which are handled and opened in assembly plants in great numbers.

SUMMARY OF THE INVENTION

It is an object of the invention to provide an improved fastening element for packings, particularly for corrugated paper which eliminates the above-outlined disadvantages.

This object and others to becomes apparent as the specification progresses, are accomplished by the invention, according to which, briefly stated, the fastening element comprises a screw which has a self-threading thread and a head plate that radially projects beyond the diameter of the thread and further, in the head plate there is provided a recess which extends into the interior of the screw body and which, in the zone of the head plate, is designed to be engaged by a turning tool.

In use, the fastening element is inserted on the shank of a screwdriver device such as a pneumatic screwdriver and is screwed into the cardboard layers with a few revolutions. The cardboard need not be provided previously with holes for receiving the fastening element.

According to a further feature of the invention, the point of the screw thread is eccentric with respect to the symmetry axis of the head plate. During the threading operation, the offset point of the screw has the function to score a circular opening into the corrugated paper.

The leading third of the screw breaks the opening and upon continued turning of the fastening screw, the latter widens the opening while the screw, by virtue of its eccentric thread, winds itself into the opening without significantly enlarging the same. The corrugated paper parts to be joined are tightened together between the thread flanks, on the one hand and the screw head, on the other hand. The total length of the fastening screw, the pitch of the thread and the screw head diameter may be altered according to requirements.

According to a further feature of the invention, the fastening element has a conical outline. It is of particular advantage to provide that the entire length of the fastening element at least approximately equals the diameter of the head plate.

According to a preferred embodiment of the invention, the screw has a conical configuration and the height of the thread at each location approximately corresponds to the diameter of the screw body at that location. Thus, in the preferred embodiment, the height of the thread at mid-length of the fastening element equals the diameter of the core (core diameter) at that location.

Expediently, the fastening element is made of plastic material which may contain additional substances such as scrap material (metal chips, etc.). If such metal chips are situated on the upper surface or project therefrom, there is thereby achieved an increased friction thus ensuring a better seating of the fastening element. It is further expedient to shape the opening in the zone of the head plate as a polygon which is adjoined by a cylindrical or conical hollow space in the inside of the screw.

BRIEF DESCRIPTION OF THE DRAWING

FIG. 1 is a side elevational view of a preferred embodiment of the invention.

FIG. 1a is a sectional view taken along line Ia—Ia of FIG. 1.

FIG. 2 is a top plan view of the preferred embodiment.

DESCRIPTION OF THE PREFERRED EMBODIMENT

Turning now to the Figures, the fastening element according to the invention comprises a head plate 1 and a screw body generally indicated at 2, forming the core of a short thread 3. The thread 3 has a relatively large height and small thickness to ensure that corrugated paper sheets are overlapped by the fastening element along a relatively large area and may be pressed together upon tightening of the element. In the head plate 1 there is provided a recess 4 which has a polygonal outline for receiving a turning tool such as a hexagonal bar for applying or removing the fastening element.

The core of the fastening element has a high material density which, during manufacture, would normally lead to long cooling periods. To shorten such cooling periods, the polygonal recess 4 continues as a conical hollow cavity 5.

The point 6 of the thread 3 is laterally offset with respect to the axis 7 of the fastening element (which is also the axis of symmetry of the head plate 1) by a distance E. The thread 3 is eccentric relative to the fastening element. Stated differently, the thread 3 has a crest 3a of spiral course—as may be well observed in FIG. 2—and the longitudinal axis of the spiral crest 3a is offset relative to the symmetry axis 7 of the fastener (that is, its head plate 1 and core 2). When the fastening element is threaded into the cardboard (for example, by means of a pneumatically operated screwdriver) the eccentric point 6 which, upon threading, travels in a circular path, tears the smooth surface of the cardboard and contacts the underlying layers into which the threads cut. The tool for tightening the fastening element may be set to a torque between 3 and 8 N/m. The angle of the thread flanks and the pitch of the fastening screw may be empirically determined in accordance with the requirements in the cardboard packings. Fastening with a fastening element according to the invention should be possible from approximately 10.8 mm for a three-ply supported corrugated cardboard of the weakest quality to approximately 26 mm at edge connections for a four-ply corrugated paper of the strongest quality.

The fastening element according to the invention permits a rapid loosening of the connection; an entire unscrewing of the fastening element along the entire thread is not necessary.

The illustrated embodiment permits an opening after a short turn in the counterclockwise direction, due to the offset thread arrangement.

The offset point of the fastening element makes possible a repeated use of the fastening element and its manufacture of synthetic material. Although the sharp point is somewhat blunted after repeated use, the desired effect is preserved at a satisfactory level by virtue of the eccentric thread course. It is noted that in case the screw point is not offset, the latter would wear very rapidly. By means of the offset thread, the pressure during threading is rapidly displaced from the point to the sides of the thread so that the screw point functions substantially for providing the initial hole.

It will be understood that the above description of the present invention is susceptible to various modifications, changes and adaptations, and the same are intended to be comprehended within the meaning and range of equivalents of the appended claims.

What is claimed is:

1. A fastening element for packing sheets comprising
   (a) a body having a lateral surface;
   (b) a head plate having a diameter constituting the largest diameter of said fastening element and an axis of symmetry passing centrally through said body; said head plate being situated at an end of said body;
   (c) a thread having a spiral crest provided on said lateral surface; said thread extending such that the spiral crest is eccentric with respect to said axis of symmetry; said thread terminating in a point situated at an end of said body remote from said head plate; said point being located externally of said axis of symmetry; and
   (d) means in said head plate situated centrally with respect thereto and configured for receiving a tool for turning the fastening element.

2. A fastening element as defined in claim 1, wherein the total length of said fastening element approximately equals the diameter of said head plate.

3. A fastening element as defined in claim 1, wherein said body is conical and wherein said thread has a varying height; said height at any location on said body approximately corresponding to the diameter of the conical body at said location.

4. A fastening element as defined in claim 1, wherein said fastening element is of a plastic material.

5. A fastening element as defined in claim 1, wherein said recess has a polygonal cross-sectional shape in said head plate and a conical shape in said body.

* * * * *